United States Patent [19]
Kolk et al.

[11] Patent Number: 5,116,639
[45] Date of Patent: May 26, 1992

[54] MONOLITHIC FINISHING PROCESS AND MACHINE FOR FURNITURE PARTS AND THE LIKE

[75] Inventors: Stephen B. Kolk, Grand Rapids; James P. Theuerkauf, Alto; Fredrick J. Walz, Caledonia, all of Mich.

[73] Assignee: Steelcase Inc., Grand Rapids, Mich.

[21] Appl. No.: 307,689

[22] Filed: Feb. 7, 1989

[51] Int. Cl.$^5$ .................. B05D 3/06; B05D 5/00; B31F 1/00
[52] U.S. Cl. .................. 427/54.1; 427/284; 427/275; 427/276; 156/211; 156/221
[58] Field of Search .................. 427/54.1, 284, 275, 427/276; 156/211, 221, 231, 232, 245, 246; 118/620

[56] References Cited

U.S. PATENT DOCUMENTS

| | | |
|---|---|---|
| 753,641 | 3/1904 | Shepherd . |
| 2,181,694 | 11/1939 | Felcher .................. 18/55.1 |
| 2,263,866 | 11/1941 | Barber .................. 219/35 |
| 2,542,860 | 1/1946 | Clements .................. 156/211 |
| 2,793,090 | 5/1957 | Wolters .................. 311/106 |
| 2,918,715 | 12/1959 | Rossi .................. 25/122 |
| 3,061,500 | 10/1962 | Kreier, Jr. .................. 156/245 |
| 3,223,056 | 12/1965 | Wilburn .................. 108/150 |
| 3,409,460 | 11/1968 | Mitchell et al. .................. 117/93.31 |
| 3,415,709 | 12/1968 | Santangelo .................. 161/44 |
| 3,529,321 | 9/1970 | Culand .................. 18/5 |
| 3,790,801 | 2/1974 | Coleman .................. 250/453 |
| 3,826,014 | 7/1974 | Helding .................. 34/1 |
| 3,840,448 | 10/1974 | Osborn et al. .................. 204/159.14 |
| 3,846,534 | 11/1974 | Hallinan et al. .................. 264/255 |
| 3,907,624 | 9/1975 | Gravely, Jr. .................. 156/214 |
| 3,918,393 | 11/1975 | Hahn .................. 427/38 |
| 3,966,165 | 6/1976 | Psensky .................. 249/120 |
| 3,976,435 | 8/1976 | Klein .................. 29/197 |
| 3,983,193 | 9/1976 | Wulker et al. .................. 264/36 |
| 4,010,374 | 3/1977 | Ramler .................. 250/492 |
| 4,053,265 | 10/1977 | Wulker et al. .................. 425/20 |
| 4,135,098 | 1/1979 | Troue .................. 250/492 R |
| 4,162,877 | 7/1979 | Nyberg .................. 425/84 |
| 4,208,587 | 6/1980 | Eastlund et al. .................. 250/492 R |
| 4,276,479 | 6/1981 | Mibu et al. .................. 250/492 R |
| 4,370,373 | 1/1983 | Janicz .................. 428/151 |
| 4,421,784 | 12/1983 | Troue .................. 427/54.1 |
| 4,483,884 | 11/1984 | Troue .................. 427/54.1 |
| 4,485,123 | 11/1984 | Troue .................. 427/54.1 |
| 4,503,086 | 3/1985 | Schultz .................. 118/620 |
| 4,558,553 | 12/1985 | Kolk .................. 52/829 |
| 4,618,322 | 10/1986 | Lagasse .................. 425/129 |

FOREIGN PATENT DOCUMENTS 2500809 7/1975 Fed. Rep. of Germany ...... 427/284

Primary Examiner—Norman Morgenstern
Assistant Examiner—Marianne L. Padgett
Attorney, Agent, or Firm—Price, Heneveld, Cooper, DeWitt & Litton

[57] ABSTRACT

A process and machine are provided to manufacture furniture parts and the like with a unique, durable, low gloss finish which has a soft, satin feel, and imparts a monolithic appearance to the part. A blank cut from a suitable substrate material is grooved about its marginal edge to a depth near the opposite surface of the blank. A liquid edge protection material is poured into the groove and fully cured. The blank is then cut through at the filled groove to create a decorative protection strip about the marginal edge of the blank. The formed blank is next coated with a preselected paint or base material. After the base coat is cured, a layer of UV curable, protective material is applied to the painted surfaces of the blank. The UV coated blank is then translated through a multi-stage, continuous feed, ultraviolet processor to selectively and sequentially cure the protective coat. Powered rollers arranged in spaced apart groups convey the parts through the processor. UV light sources are located above and below the rollers, vertically in line with the spaces between adjacent roller groups, and have selectively oriented reflectors which contemporaneously and uniformly radiate all of the UV coated surfaces of the blank to form a mar-resistant, low gloss protective coat, which together with the base coat, imparts a soft feel, and monolithic appearance to the finished part.

35 Claims, 9 Drawing Sheets

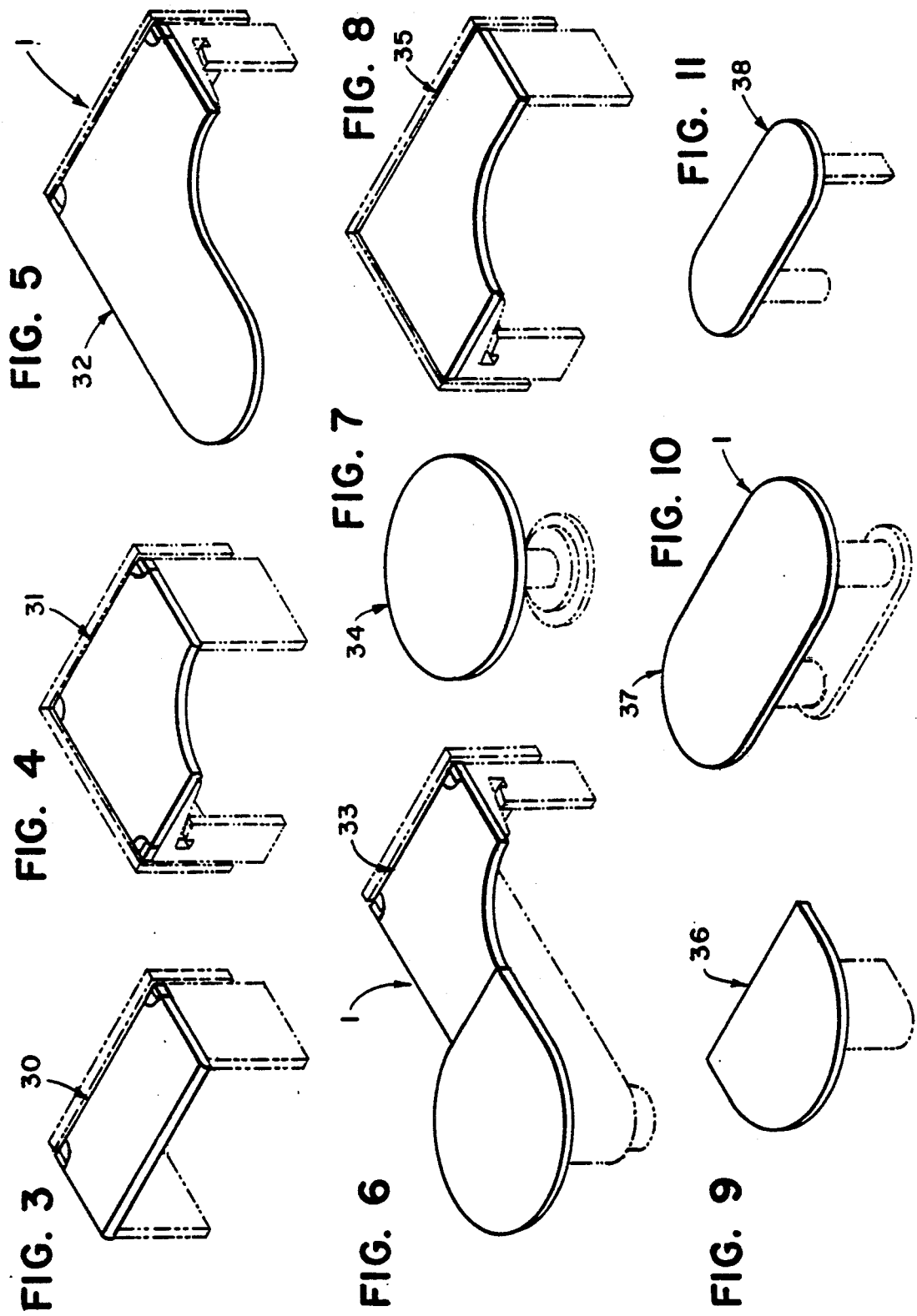

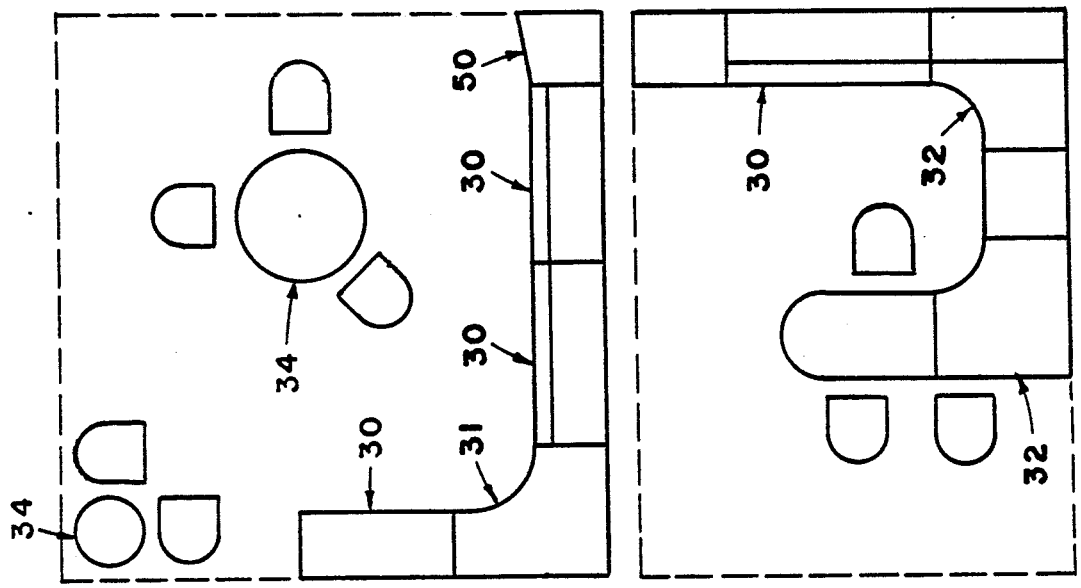
FIG. 12
FIG. 14
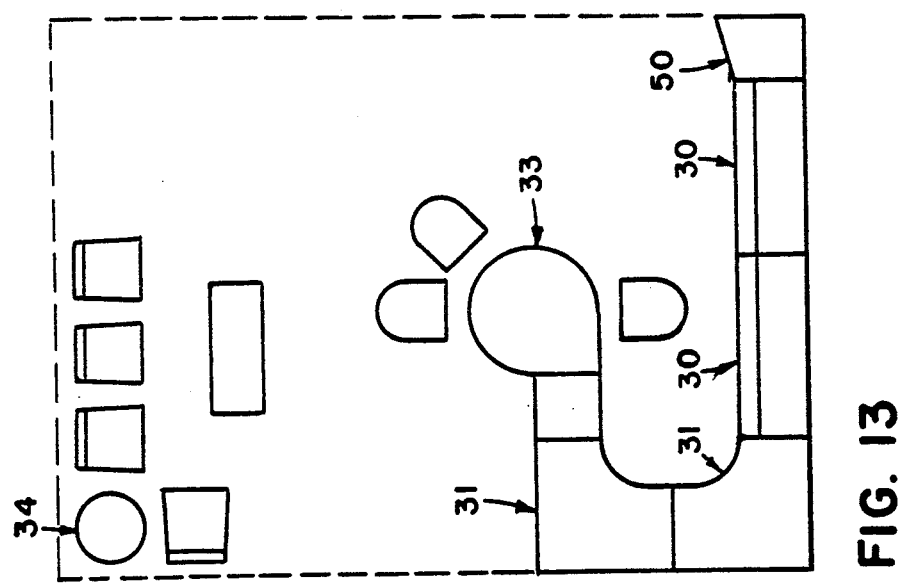
FIG. 13

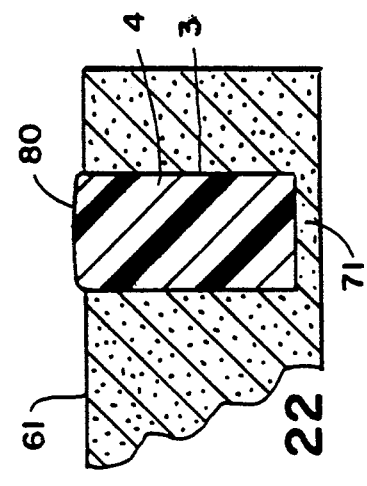
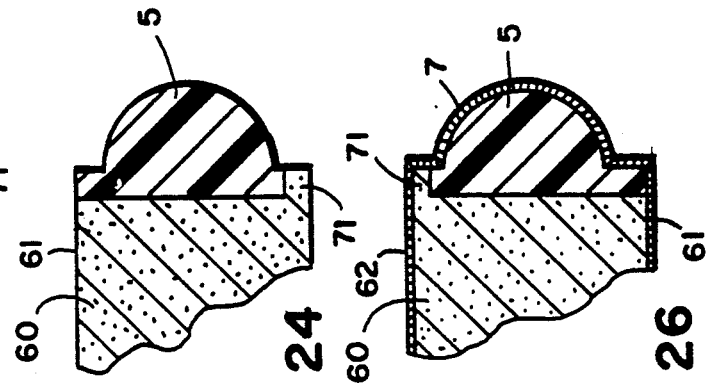
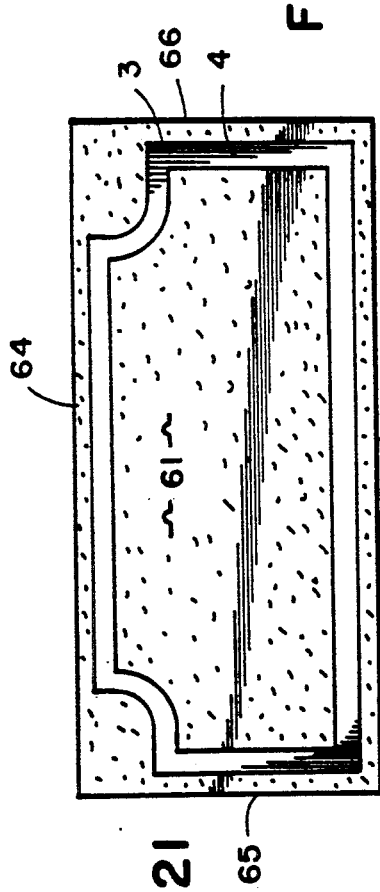
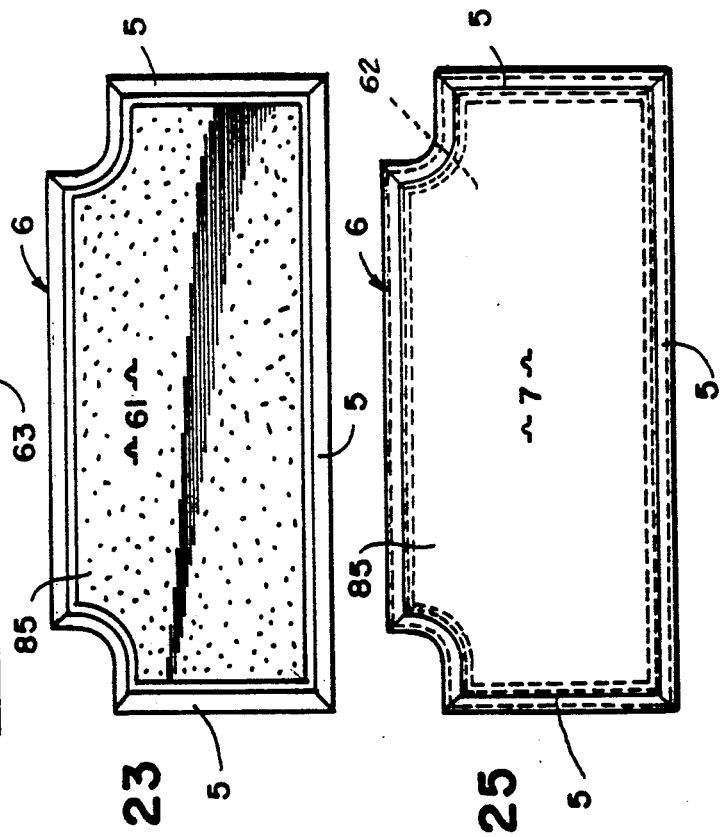

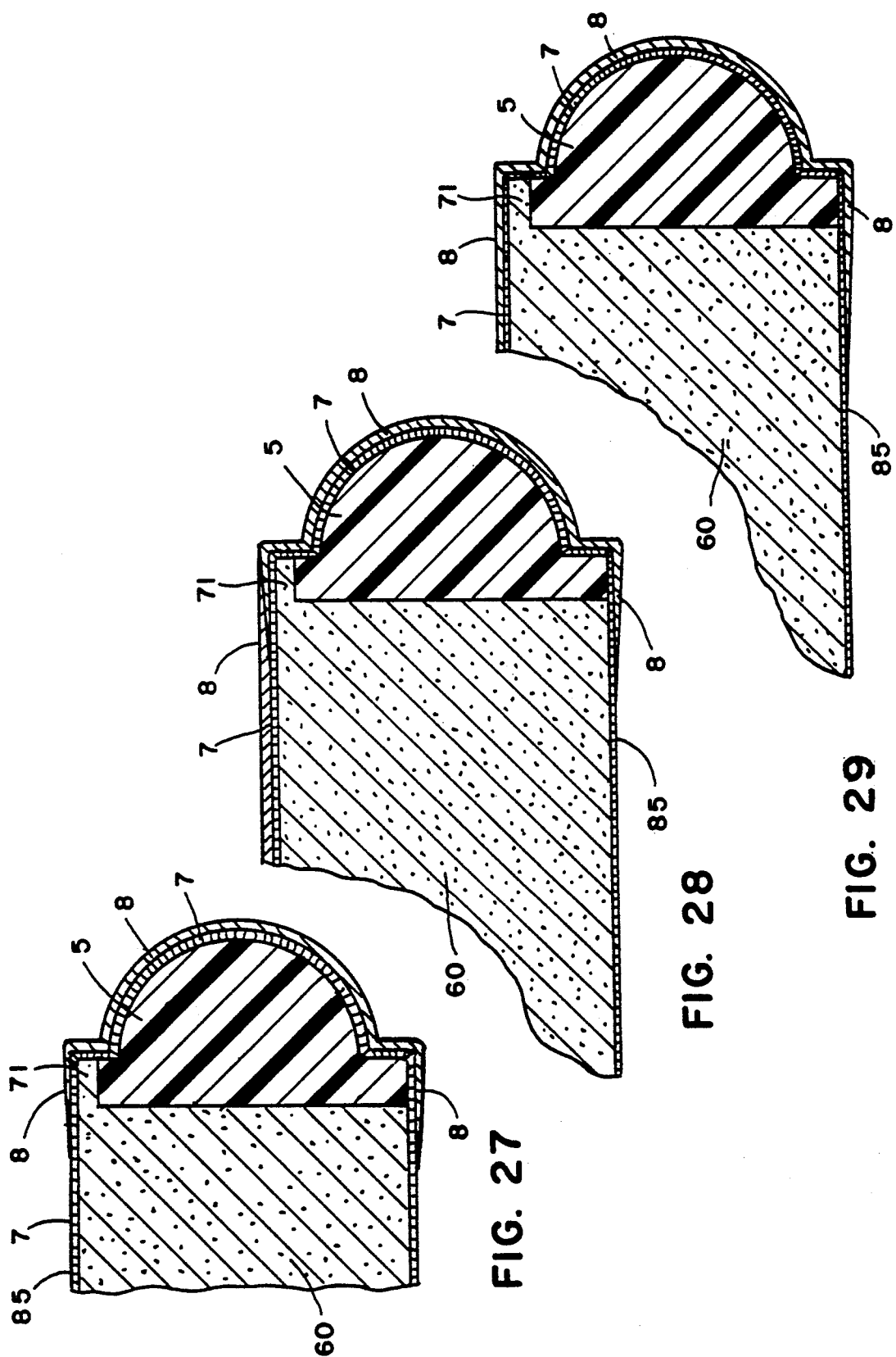

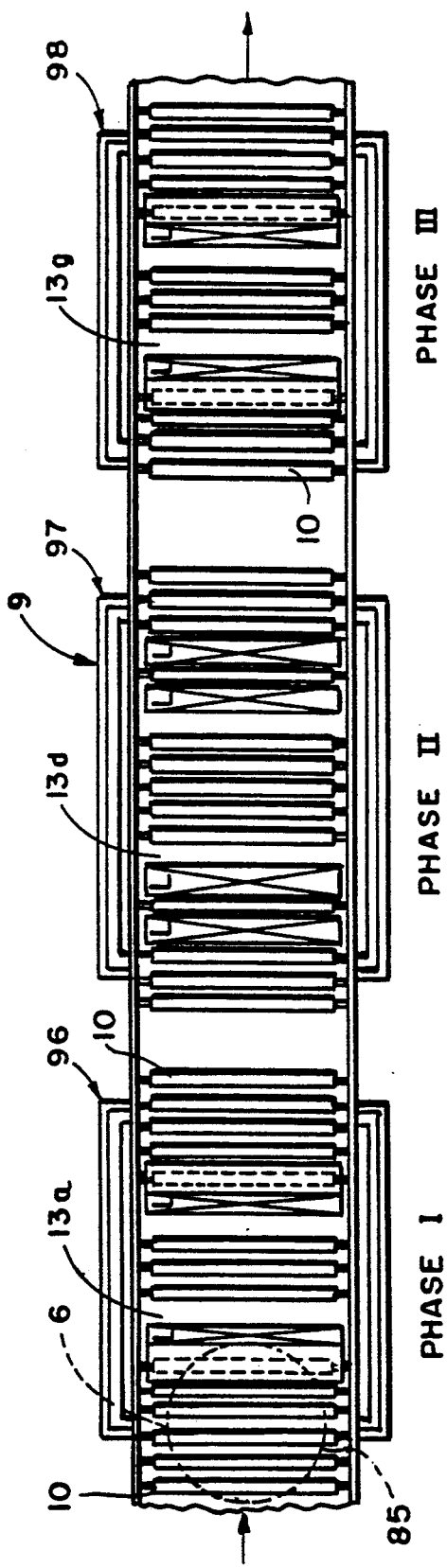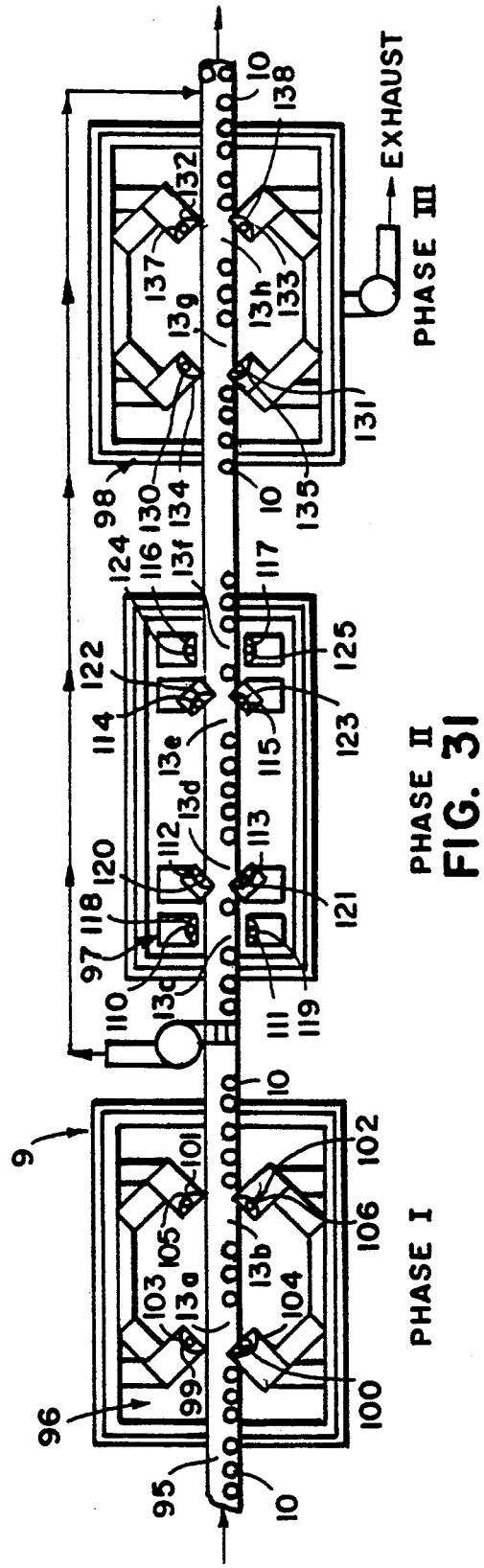

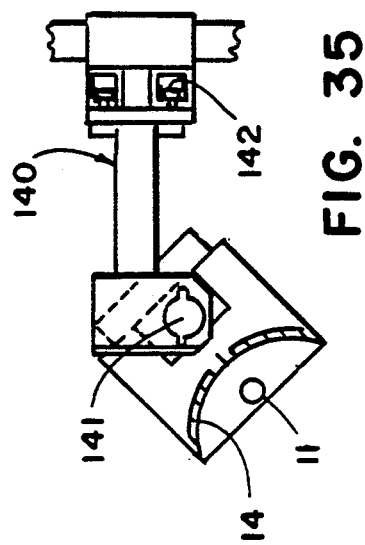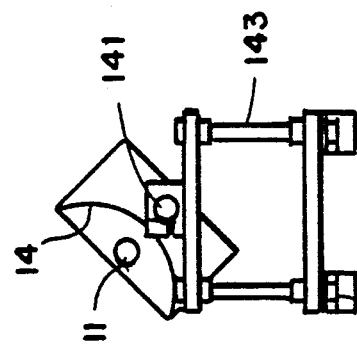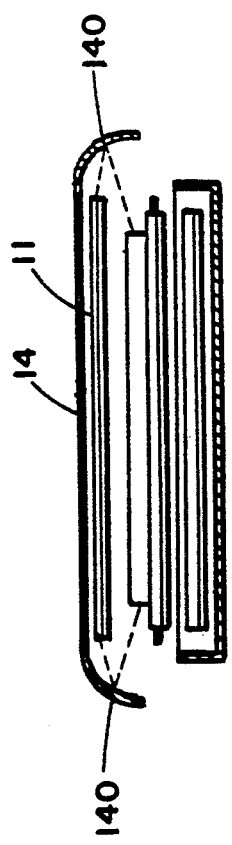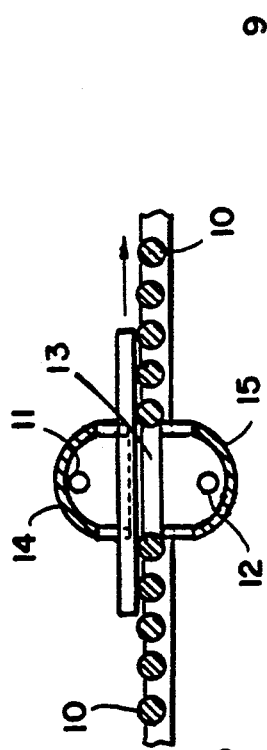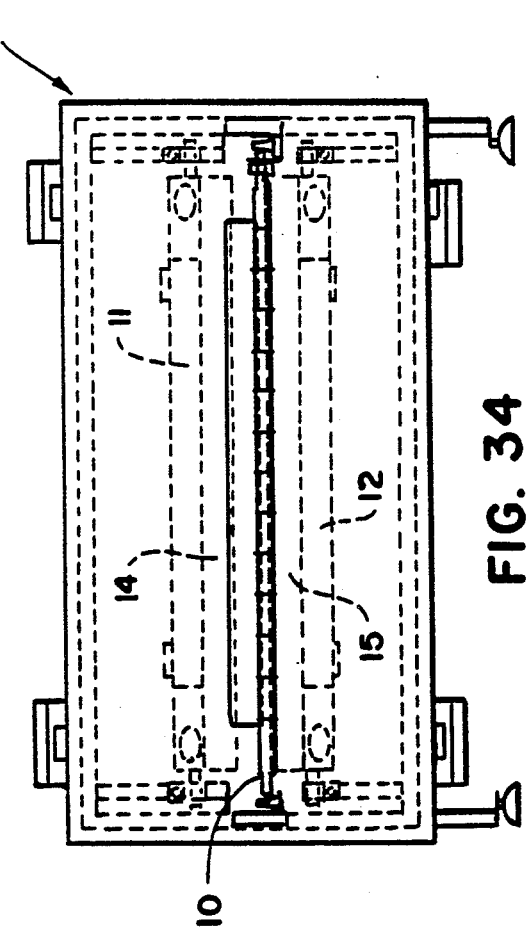

5,116,639

MONOLITHIC FINISHING PROCESS AND MACHINE FOR FURNITURE PARTS AND THE LIKE

CROSS-REFERENCE TO RELATED APPLICATIONS

The present application is related to co-pending U.S. Pat. application Ser. No. 307,775, filed Feb. 7, 1989, entitled MODULAR FURNITURE, which is hereby incorporated by reference.

BACKGROUND OF THE INVENTION

The present invention relates to surface finishes for three dimensional articles, and in particular to a monolithic finishing process and machine for furniture parts, and the like.

Many different types of products require a specialized surface finish to accommodate the aesthetic and/or utilitarian needs of a particular application. In the office furniture industry, worksurfaces, such as desk tops, tabletops, countertops, writing surfaces, and the like must meet several different design criteria, including smoothness, hardness, durability and appearance.

One known method for finishing furniture worksurfaces comprises applying a veneer to the top surface of a sheet of substrate material. An edge strip is normally applied to the marginal edges of the worksurface, and the veneer and edge strip are blended together. Both natural and synthetic veneers have been used quite extensively in such applications, including wood, glass, vinyl, and the like. However, veneer type finishes can be rather expensive to manufacture, and often present inherent design limitations. The edge strip imparts a framed appearance to the worksurface that breaks up the lines of top, and further limits the aesthetics of the associated furniture article.

Painted finish-surfaces for furniture worksurfaces are typically less expensive to manufacture, but are normally rather soft, and tend to mar easily, even when treated with a protective coating, such as lacquer, clear epoxy, or other similar finishes.

Soft, low gloss finishes have recently become quite popular in the office furniture industry, particularly with respect to systems furniture, and other similar modular furniture designs for open office plans Also, uncluttered, smooth flowing designs are similarly desirable The appearance and feel of such surface treatments is presently considered an important marketing feature, particularly for office furnishings. Known low gloss finishes are either relatively expensive to manufacture, or have rather poor utilitarian characteristics, especially with respect to durability and mar resistance.

SUMMARY OF THE INVENTION

One aspect of the present invention is a monolithic coating process for economically making durable furniture panels and the like. A blank is formed from a sheet of substrate material to a shape preselected in accordance with a finished panel article A base coat material is provided, which is formulated to adhere to the substrate material. A layer of base coat material is applied to at least the top and marginal edge surfaces of the blank, so as to substantially completely cover the same. The base coat material is cured to a substantially dry condition to form a base coat. A liquid, protective coat material is provided, which cures when exposed to selected ultraviolet radiation, and is formulated to adhere to the base coat material, and provide a mar-resistant coat over at least selected portions of the base coat. The protective coat material is applied to at least the top and marginal edge surfaces of the blank to define a protective exterior surface area of the blank which is substantially completely covered with the protective coat material. A continuous feed, ultraviolet processor is provided for selectively curing the protective coat material. The blank with uncured protective coat material thereon is translated through the ultraviolet processor at a substantially constant rate. The UV coated surfaces of the blank are radiated substantially contemporaneously with ultraviolet energy as the blank passes therethrough to partially cure the protective coating material thereon to facilitate forming a selected exterior appearance. Subsequently, the UV coated surfaces of the blank are again radiated substantially contemporaneously with ultraviolet energy as the blank continues through the processor to complete curing of the protective coat material to form a mar-resistant, low gloss protective coat over the base coat. The base coat and protective coat collectively impart a monolithic appearance to the finished panel article.

Yet another aspect of the present invention is a fill groove edge forming process for making furniture worksurfaces and the like. A blank is formed from a sheet of substantially rigid substrate material into a shape preselected in accordance with a selected worksurface article. A groove is formed through one surface of the blank located a preselected distance laterally inwardly from the marginal edge of the blank to a depth adjacent to but not through the opposite surface of the blank. A curable, liquid edge protection material is provided, which is formulated to adhere to the substrate material, and adapted to provide a durable, dent resistant edge guard for the marginal edge portion of the worksurface article. The edge protection material is poured into the groove to a selected level, and is cured in place in the groove to a solid condition. The cured edge protection material in the groove, as well as the adjacent surface of the blank are then cut through to create a decoratively shaped, integrally formed protective strip about the marginal edge of the worksurface article.

Yet another aspect of the present invention is a processor for curing photocurable compositions disposed on geometrically solid articles, such as furniture worksurfaces. The processor includes a tunnel shaped irradiation chamber, configured to receive therethrough a three-dimensional article. A conveyor, such as powered rollers or the like, translate the article with uncured photocurable composition thereon through the irradiation chamber at a substantially constant rate A first UV light source is disposed generally above the article translating mechanism, and is adapted to direct ultraviolet flux onto the upper surface of the article as the article translates thereby. A second UV light source is disposed generally below the article translating mechanism, and is adapted to direct ultraviolet flux onto the lower surface of the article as the article translates thereby. Ultraviolet flux is also directed onto the leading and trailing edges, as well as the opposite side edges of the article, as the article approaches and recedes from the first and second light sources, such that all of the coated surfaces of the article are irradiated substantially contemporaneously and generally uniformly as the article translates through the irradiation chamber, so as to quickly and evenly cure the photocure composition in a single pass, continuous feed operation.

The principal objects of the present invention are to provide a durable, satin like finish which is particularly well adapted for office furniture worksurfaces and the like, and has a unique, soft feel, and a low reflective or low gloss monolithic appearance to the same. The surface finish has a very soft appearance and feel which is aesthetically quite pleasing, yet is substantially maintenance free and mar-resistant. The surface finish may be used in conjunction with relatively inexpensive substrate materials, such as particle board, flake board and the like, such that an attractive durable worksurface can be manufactured quite economically. A wide variety of different base colors may be used with the surface finish, such that the finish can be easily matched and/or coordinated with conventional painted surfaces. A unique fill groove edge forming process forms an integral edge strip for variously shaped worksurfaces, without the need for separate molds. The present method and apparatus can be used in conjunction with worksurfaces having different shapes and sizes, and may also be used to cover multi-part top constructions, such as those having a separate marginal edge strip or guard. In each case, the surface finish imparts a very unique monolithic appearance to the part, which makes it look as though the part were chiseled from a solid block of material. Both the process and machine are quite efficient and economical, and particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 3 is a perspective view of a straight worksurface, with a related modular furniture unit shown in phantom.

FIG. 4 is a perspective view of a corner worksurface, with a related modular furniture unit shown in phantom.

FIG. 5 is a perspective view of a bullet conference worksurface, with a related modular furniture unit shown in phantom.

FIG. 6 is a perspective view of a P-top conference worksurface, with a related modular furniture unit shown in phantom.

FIG. 7 is a perspective view of a circular table worksurface, with a related modular furniture unit shown in phantom.

FIG. 8 is a perspective view of an extended corner worksurface, with a related modular furniture unit shown in phantom.

FIG. 9 is a perspective view of a half-round shared conference worksurface, with a related modular furniture unit shown in phantom.

FIG. 10 is a perspective plan view of an oblong worksurface, with a related modular furniture unit shown in phantom.

FIG. 11 is a perspective view of a countertop worksurface, with a related modular furniture unit shown in phantom.

FIG. 12 is a diagrammatic, top plan view of an open office floor plan with individual worksurfaces arranged to form a first workstation.

FIG. 13 is a diagrammatic top plan view of another open office floor plan with individual worksurfaces arranged to form a second workstation.

FIG. 14 is a diagrammatic top plan view of yet another open office floor plan with individual worksurfaces arranged to form a third workstation.

FIG. 21 is a top plan view of the blank illustrated in FIG. 19, shown with the groove completely filled with the edge protection material.

FIG. 22 is an enlarged, fragmentary vertical cross-sectional view of the blank illustrated in FIG. 21, showing the groove completely filled with edge protection.

FIG. 23 is a top plan view of the blank illustrated in FIG. 21, wherein the edge protection material and underlying blank have been cut through to form a decorative protective marginal edge.

FIG. 24 is an enlarged, fragmentary vertical cross-sectional view of the blank illustrated in FIG. 23, showing the formed protective marginal edge.

FIG. 25 is a top plan view of the formed blank illustrated in FIG. 23, with a base coat material applied thereover.

FIG. 26 is an enlarged, fragmentary vertical cross-sectional view of the formed blank illustrated in FIG. 25, showing the base coat material applied thereover.

FIG. 27 is an enlarged, fragmentary vertical cross-sectional view of the blank illustrated in FIG. 25, particularly showing a protective coat material applied over the marginal edge of the blank.

FIG. 28 is an enlarged, fragmentary vertical cross-sectional view of the blank illustrated in FIG. 27 with a layer of protective coating material over the top surface of the blank.

FIG. 29 is an enlarged, fragmentary vertical cross-sectional view of the blank illustrated in FIG. 28, shown in a fully cured, finished condition.

FIG. 30 is a diagrammatic top plan view of a UV processor embodying the present invention.

FIG. 31 is a diagrammatic side elevational view of the UV processor.

FIG. 32 is a diagrammatic vertical cross-sectional view of an upper portion of the UV processor, taken through an end portion thereof.

FIG. 33 is a diagrammatic vertical cross-sectional view of the UV processor, taken along a side portion thereof.

FIG. 34 is an end elevational view of the UV processor.

FIG. 35 is an end elevational view of a high intensity UV light source.

FIG. 36 is an end elevational view of a low intensity UV light source.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the machine portion of the invention as oriented in FIGS. 30 and 31. However, it is to be understood that the invention may assume various alternative orientations, except where expressly specified to the contrary. It is also to be understood that the specific devices, processes and step sequences illustrated in the attached drawings, and/or described in the following specification are simply exemplary embodiments of the inventive concepts defined in the appended claims. Hence, specific dimensions and other physical characteristics relating to the embodiments disclosed herein, are not to be considered as limiting, unless the claims expressly state otherwise.

Figure 1:
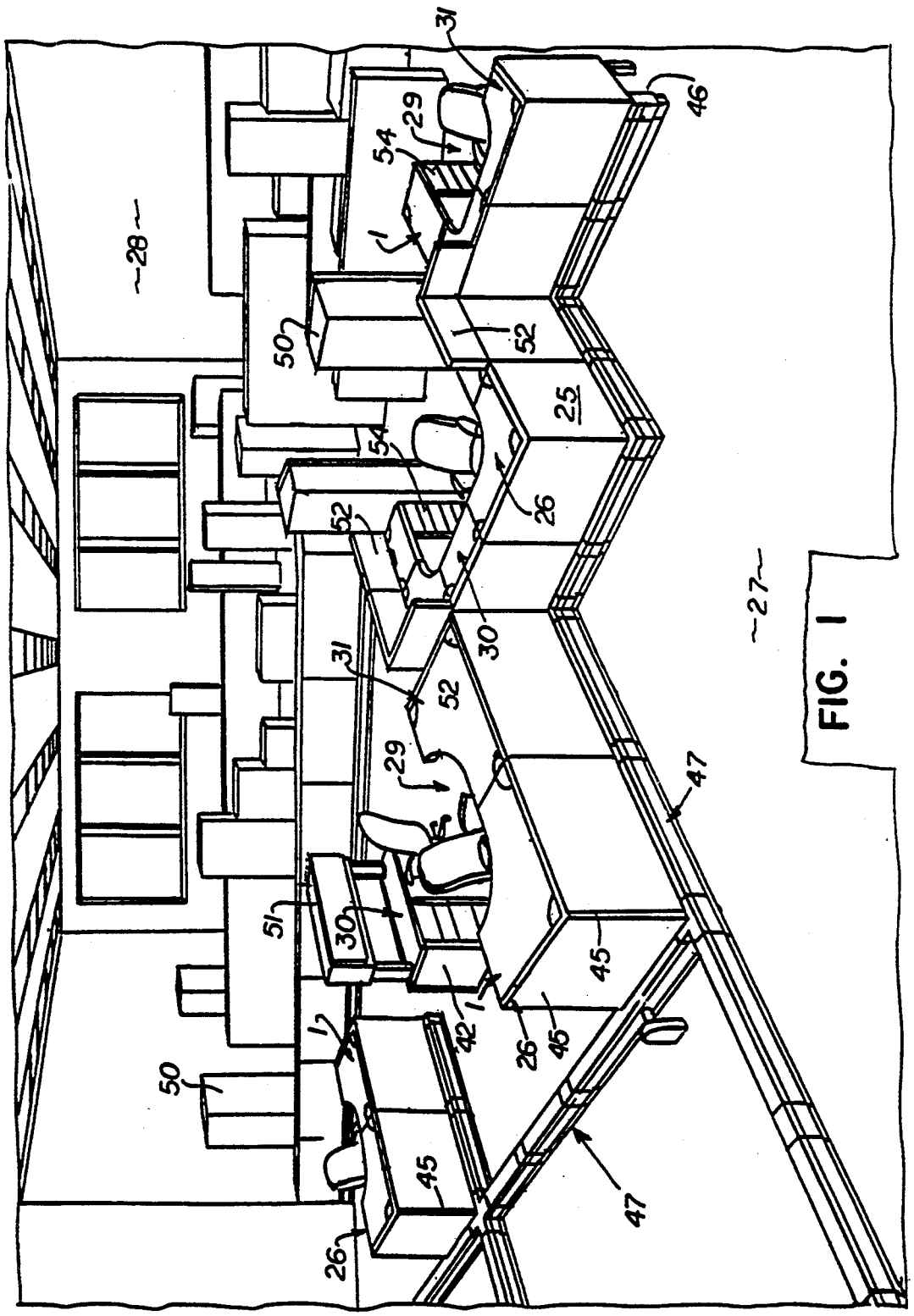
FIG. 1 is a perspective view of a utility floor track system, and a related modular furniture arrangement which contains parts manufactured in accordance with the present invention.

The present invention relates to a process and a machine for surface finishing three-dimensional objects, particularly furniture parts, such as the illustrated worksurfaces, which are generally designated by the reference numeral 1 (FIG. 1). The subject surface finish of worksurface 1 is both wear and stain resistant, with a flat, non-glare silky feel, and a unique monolithic appearance.

The process includes providing a blank 2 (FIGS. 15-20) cut from a suitable substrate material. A groove 3 is formed through one surface of blank 2 about its marginal edge to a depth near the opposite surface of blank 2. A liquid edge protection material 4 is poured into groove 3, and fully cured in place. Blank 2 is then cut through at the filled groove 3 by means such as routing or the like, to create a decorative protective strip 5 (FIGS. 23 and 24) about the marginal edge of blank 2, and thereby define a shaped or formed top or part 6. The formed part 6 is coated with a selected paint or base material 7 (FIGS. 25 and 26). After base coat 7 has cured, a layer of UV curable, protective material 8 (FIGS. 27-29) is applied to the painted surfaces of formed part 6. The UV coated part 6 is then translated through a multi-stage, continuous feed, ultraviolet processor 9 (FIGS. 30-34) to selectively and sequentially cure protective coat 8. UV processor 9 includes powered rollers 10 arranged in spaced apart groups, which convey formed parts 6 through UV processor 9 at a substantially constant speed. UV light sources generally designated by the reference numerals 11 and 12 (FIGS. 32-34) are located above and below rollers 10, vertically in line with the spaces 13 disposed between adjacent groups of rollers 10, and have selectively oriented reflectors 14 and 15 respectively, which contemporaneously and uniformly radiate all of the UV coated surfaces of the formed part 6, so that the protective material 8 creates a mar-resistant, low gloss protective coating 8, which together with base coat 7, imparts a soft feel, and a monolithic appearance to the finished worksurface 1.

Figure 2:
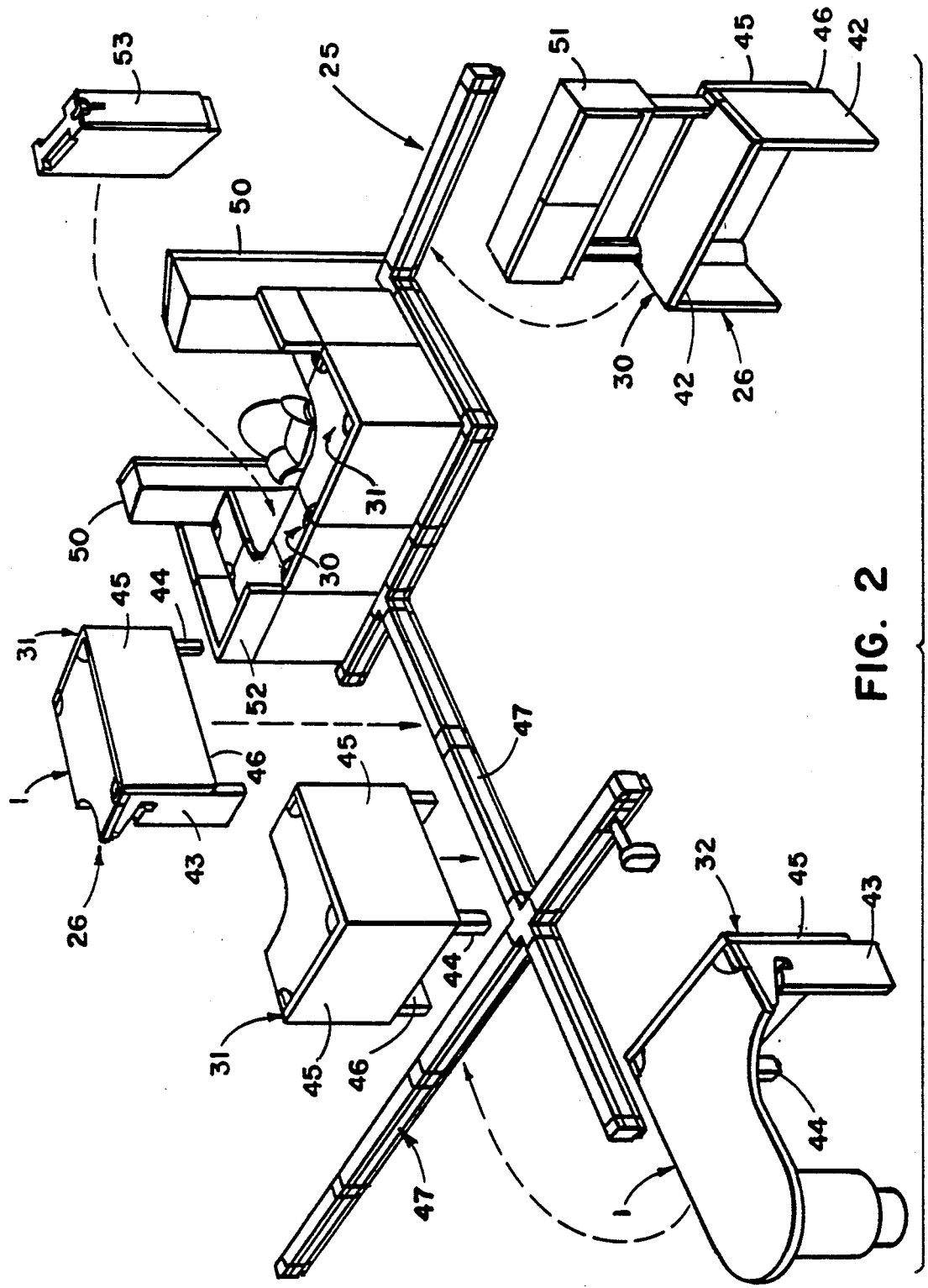
FIG. 2 is an exploded perspective view of the utility floor track system and the modular furniture.
Figure 16:
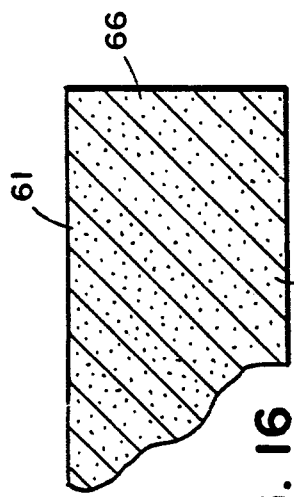
FIG. 16 is an enlarged, fragmentary vertical cross-sectional view of the blank.

As will be appreciated by those skilled in the art, the present monolithic finishing process, as well as the related UV processor machine 9, can be used in conjunction with a wide variety of different three-dimensional objects. The present invention is particularly adapted for use in conjunction with office furniture parts, such as the illustrated worksurfaces 1, which in FIGS. 1-3 are shown in conjunction with a unique modular furniture arrangement 25 that is the subject of co-pending U.S. Pat. application Ser. No. 307,775, filed Feb. 7, 1989, entitled MODULAR FURNITURE, and has been incorporated herein by reference.

The illustrated modular furniture arrangement 25 (FIGS. 1-3) comprises a plurality of individual furniture units 26, each of which is independently supported on the floor 27 of office space 28, and is shaped to cooperate with other related furniture units 26 to form workstations 29. In the examples illustrated in FIGS. 1-11, several different types of modular furniture units 26 are illustrated, which are individually designated by the reference numerals 30-38 respectively. Furniture unit 30 is a straight worksurface unit. Furniture unit 31 is a corner worksurface unit. Furniture unit 32 is a bullet conference unit. Furniture unit 33 is a P-top conference unit. Furniture unit 34 is a circular table. Furniture unit 35 is an extended corner worksurface unit Furniture unit 36 is a half-round, shared conference worksurface unit Furniture unit 37 is an oblong table, and furniture unit 38 is a countertop worksurface.

Each of the illustrated furniture units 30-38 (FIGS. 1-3) includes at least one worksurface 1 selected from a wide variety of different shapes and sizes, and two separate supports at the opposite ends of worksurface 1, in the form of either an end panel 42 (FIG. 2), or an intermediate support 43. A corner leg 44 is provided at the center of corner unit 31, bullet conference unit 32, and extended corner unit 35. Each of the illustrated modular furniture units 30-38 also includes at least one back panel 45, which covers the front faces or surfaces of the associated furniture unit 26. Back panels 45 have a specially designed, predetermined depth, so as to form a gap or recess 46, which extends along the forward base area of each of the furniture units 26, and is adapted to receive therein a unique floor track system 47 for utilities and the like, which is the subject of a co-pending patent application. The arrangement illustrated in FIG. 2 clearly shows the recess 46, and its physical cooperation with the floor track system 47.

In the open office plan arrangements illustrated in FIGS. 1-14, additional modular furniture units 26 and related accessories are provided, including storage towers 50, overhead cabinets 51, privacy screens 52, day filers 53 and freestanding pedestals 54. Many characteristics of these additional furniture units 26 and accessories are unique, independent of the present method and apparatus, and are the subject of co-pending patent applications.

Although the specific worksurfaces 1 for furniture units 30-33 have different plan shapes, as illustrated in FIGS. 12-14, they are constructed in a similar manner. Hence, for ease of description herein, the process for making a particular worksurface 1 shall generally relate to the straight worksurface unit 30. However, it is to be understood that the disclosed process may also be practiced to make worksurfaces 1 for furniture units 31-38, as well as many other three-dimensional articles.

The illustrated blank 2 (FIGS. 15-20) is preferably constructed from a sheet of substantially rigid substrate material Blank 2 may be constructed from a wide variety of known construction materials, including solid wood planks, plywood, particle board, flake board, fiberboard, hard board, rigid plastic foam, vinyl, etc. or the illustrated medium density fiberboard 60. Blank 60 has a generally rectangular plan configuration, and includes substantially flat, mutually parallel upper and lower surfaces 61 and 62, as well as marginal edges 63-66. Blank 60 is selected of a size slightly greater in both width and length than the associated dimensions of the final worksurface 1 to be formed. The illustrated blank 60 may have its upper and lower surfaces 61 and 62 treated with a coat of sealer or filler material (not shown) which facilitates uniform coverage of base coat 7, and reduces absorption of the same into blank 60. The sheets of substrate material may be so treated with sealer for ease of manufacture.

Figure 18:
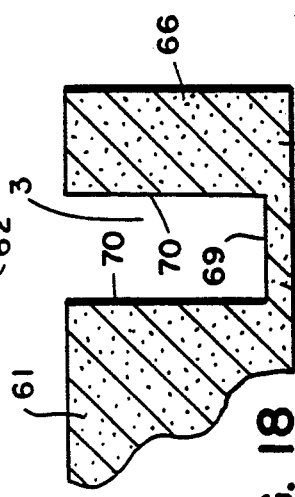
FIG. 18 is an enlarged, fragmentary vertical cross-sectional view of the blank illustrated in FIG. 17, particularly showing the marginal groove.
Figure 17:
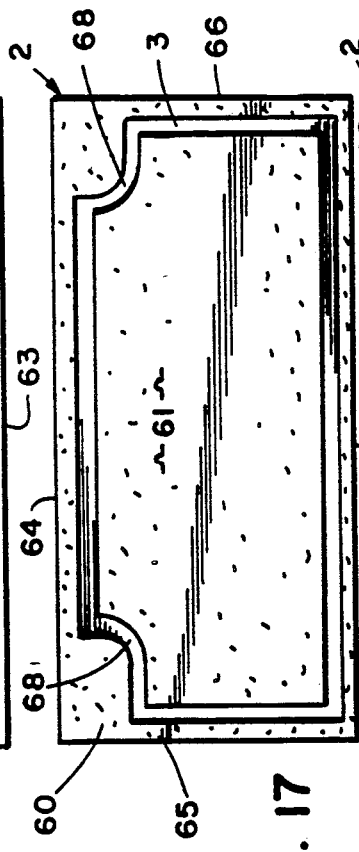
FIG. 17 is a top plan view of the blank, with a groove formed about the marginal edge thereof.

As illustrated in FIGS. 17 and 18, groove 3 is formed through the top surface 61 of blank 60 to a depth adjacent to the lower surface 62 of blank 60. In the illustrated example, groove 3 is positioned inwardly from and generally parallel with the marginal edges 63-66 of blank 60, with the exception of curved portions 68 at the rearward corners of blank 60. The curved corners 68 of blank 60 facilitates use in conjunction with the unique modular furniture units 26 described above. In the illustrated example, blank groove 3 has a generally rectangular vertical cross-sectional configuration (FIG. 18), defined by a base 69, and upstanding side walls 70. Preferably, blank groove 3 is formed to a depth that is in the range of 0.005 inch to 0.032 inch from the lower surface 62 of blank 60, thereby forming a thin flange 71. Blank groove 3 preferably has a width that is 1/16-⅛ inch wider than the final edge profile desired to facilitate shaping, and is also large enough to facilitate complete filling of the groove with viscous types of edge protection material 4. In the illustrated example, blank groove 3 has a width greater than around ⅜ inch, and is formed by routing, or other similar machining processes.

In the event edge protection material 4 comprises a urethane, or another compound which reacts with water, after groove 3 is formed in blank 60, the grooved blank is preferably dried or otherwise treated to remove moisture from those surfaces 69-70 of blank 60 which define groove 3, particularly when the blank material is hygroscopic, such as fiberboard. In one example of the present invention, blank surfaces 69-70 of a fiberboard blank 2 are dried to have less than 5% moisture by weight. A variety of conventional drying processes, such as oven drying, may be used in this regard.

Figure 20:
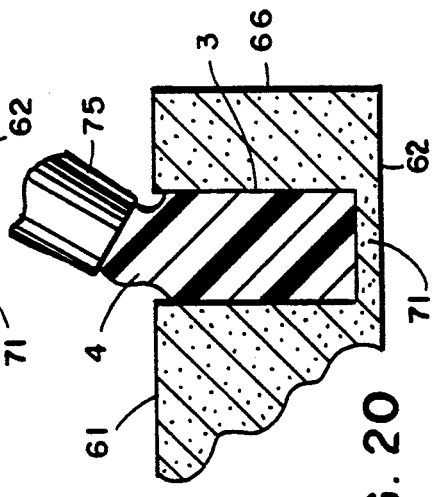
FIG. 20 is an enlarged, fragmentary vertical cross-sectional view of the blank illustrated in FIG. 19, showing filling the groove with edge protection material.
Figure 15:
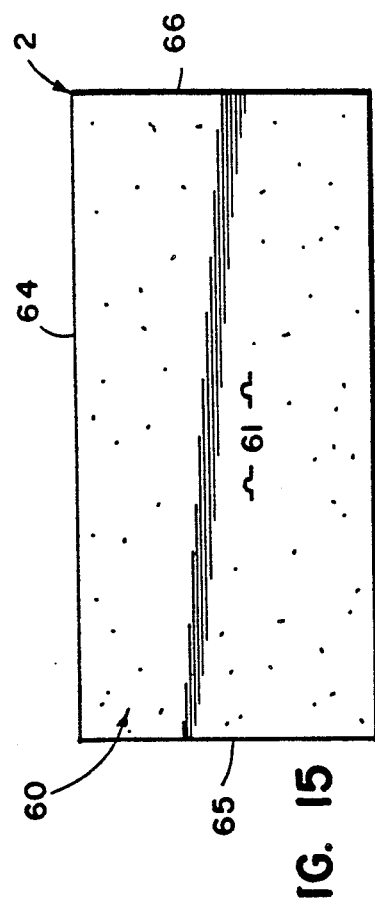
FIG. 15 is a top plan view of a straight worksurface blank.
Figure 19:
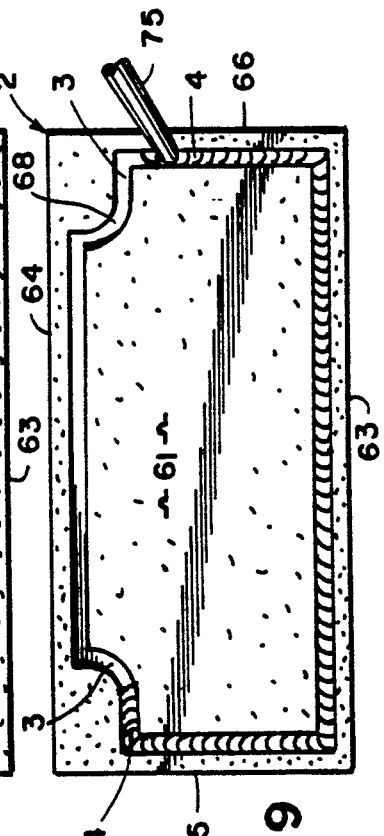
FIG. 19 is a top plan view of the grooved blank illustrated in FIG. 18, showing edge protection material being poured into the groove.

As illustrated in FIGS. 19-20, after the grooved blank 60 is dried to the extent desired, a curable, liquid edge protection material 4, formulated to adhere to particle board blank 60, is cast or poured into groove 3. Edge protection material 4 may comprise a variety of different types of castable resin formulations, such as polyester, polyurethane, epoxy, or other suitable resin compounds. Furthermore, edge protection material 4 may be pigmented or colored to either match or contrast with the other surface materials. In one example of the present invention, edge protection material 4 comprises a solid elastomer urethane, with a two-part formulation that is mixed to chemically cure. An example of such a polyurethane is manufactured by BASF Wyandotte Corporation under the trade name Elastocase—No. 7011U. Edge protection material 4 is liquid in its uncured state, and is injected into groove 3 through a nozzle 75, either manually or through a CNC control arm. Since polyurethanes tend to foam when exposed to moisture, the drying of blank 60 is particularly important to insure a proper bond with grooved blank 60, and to secure a smooth surface finish on edge strip 5. Other types of edge protection materials may not require drying blank 2. As best illustrated in FIGS. 21-22, edge protection material 4 is inserted into groove 3 to a level slightly above the upper surface 61 of blank 60 to insure that groove 3 is completely filled with edge protection material 4.

After injection of edge protection material 4 into blank groove 3, the edge protection material 4 is fully cured to a solid state, as illustrated in FIGS. 21 and 22. In the illustrated example, the polyurethane edge protection material 4 is a chemical cure which takes place at ambient conditions within a relatively short period of time, in the range of 5-20 minutes.

After edge protection material 4 is fully cured, a cutting operation is performed through the cured edge protection material 4 in groove 3, as well as the adjacent flange 71 of blank 60 to create a decorative shaped, integrally formed, protective strip 5, which extends about and defines the marginal edges of worksurface 1. In the illustrated example, flange 71 of blank 60 is oriented at the top of the finished worksurface 1, such that groove 3 opens downwardly in this orientation. In this manner, the free surface 80 of the cured edge protection material 4 is generally hidden from sight. Preferably, the edge cutting step is performed by routing, either by virtue of a manual router, or a CNC router. Also, the edge cutting step is preferably performed in a two pass routing operation, wherein the first pass removes the corners and other large sections of particle board blank 60, and the second step routes the remaining marginal edges to their finished shape. However, as will be appreciated by those having skill in the art, other types of machining processes and techniques may also be used to form protective edge strip 5. For example, the free surface 80 (FIG. 22) of cured edge protection material 4 may be sanded flush or slightly inclined upwardly with respect to the surface 61 of blank 60 after the edge forming process. In the illustrated example, edge strip 5 has a central convex shape with opposite flat beads, which is known in the trade as a "bullnose" configuration. Other complex shapes may also be formed on edge strip 5. Edge strip 5 is resilient, dent-resistant, and serves to absorb impact forces applied to the associated marginal edge of worksurface 1 to protect the same, and alleviate chipping, and the like. Unlike conventional veneer edge strips, the present edge strip 5 blends in smoothly with the top surface 61 of blank 60, without any spaces or grooves, to contribute to the monolithic appearance of the finished worksurface 1.

The assembled particle board blank 60 and integrally formed edge strip 78 are hereinafter generally designated by the reference numeral 85 (FIGS. 23-24). Blank assembly 85 is preferably sanded over top surface 61 and marginal edge strip 5 to remove any machining marks. The illustrated blank assembly 85 is then surface finished to provide a durable, low gloss finish which imparts a monolithic appearance to the blank assembly 85 to create worksurface 1.

It is to be understood that the surface finishing process disclosed herein may be used in conjunction with worksurfaces 1, and other articles, which do not have the fill groove edge strip 5 noted above, and that the two processes can be practiced in alternative sequences. Other edge finishing techniques, such as adhered veneer edge strips, or simply sanded edge surfaces may also be used to prepare the marginal edges of blank 60. Furthermore, blanks 60 may be preformed to their finished shape.

The base coat material 7 (FIGS. 25 and 26) is a curable liquid base coat that is formulated to adhere to all surfaces of the blank assembly 85, including fiberboard 60 and polyurethane edge strip 78. The base coat material 7 may be selected from a number of different types of paint or pigmented coatings, so long as they properly adhere to all surfaces of blank assembly 85, and uniformly coat and color the same. In one example of the present invention, base material 7 comprises a two component polyester, such as that manufactured by Environmental Coatings, Inc. under the trade name U.V. Polyester Melimine Base Coat and is available in a wide variety of different colors and surface effects.

Base material 7 (FIG. 26) is preferably applied uniformly to all surfaces of blank assembly 85 by means such as spraying, roll coating, or the like. In the illustrated example, base coat 8 has a relatively uniform thickness in the range of 2–3 mills. The uniform coating of all surfaces of blank assembly 85 alleviates warpage and/or other distortion of the shape of worksurface 1, and also contributes to the monolithic appearance of the finished worksurface 1. Base coat 7 causes edge strip 5 to blend in smoothly with the top surface 61 of blank assembly 85 without any grooves, cracks, or the like, and without any color, texture or other surface finish variations. Base material 7 is completely cured, by means such as oven drying before further processing. After the applied base material 7 has fully cured, the painted surfaces of assembled blank 85 may be sanded lightly to remove any imperfections in the base coat. Furthermore, a second coat of base material 7 may also be applied to insure proper coverage and color depth. If a second coat of base material 7 is required, it is preferably applied and cured in a manner substantially identical to the process described above. A second sanding of the painted surfaces is also preferred in the event a second coat of base material 7 is applied, so as to remove any imperfections in the base coat, and to facilitate adhesion of the protective coat material 8.

The exterior surfaces of sanded blank assembly 85 are then fully cleansed to remove all loose debris, such as dust, sandings, and the like, by brushing, vacuum, ionized air blast, tack cloth, or other similar means, which do not expose the surfaces of blank assembly 85 to moisture. The drycleaned blank assembly 85 is isolated in a dust free atmosphere, such as in a laminar flow chamber, up until the time that the protective coat material 8 is applied.

Protective coat material 8 (FIGS. 27–29) is a liquid which is formulated to adhere to base coat material 7, and cures when exposed to selected ultraviolet radiation. Protective coat material 8 is substantially clear, and may be selected from a wide variety of different UV (ultraviolet) curable materials. In one working embodiment of the present invention, protective coat material 8 comprises an acrylic type UV tricuremat topcoat, such as that manufactured by Pittsburgh Plate Glass Company under the trade name Raycron-Code R690N75.

In the illustrated example (FIGS. 27–29), protective coat material 8 is applied to blank assembly 85 through a two-step process. The first application step comprises spraying, or otherwise applying protective coat material 8 uniformly onto the edge strip 5, and other blank surfaces which collectively define the marginal edge 87 of blank assembly 85, and contemporaneously overspraying onto the outer marginal portions of the upper surface 61 and lower surface 62 of blank assembly 85, as illustrated in FIG. 27. In one working embodiment of the present invention, protective coat material 8 is overlapped onto the lower surface 62 of blank 60 by an amount in the range of three to six inches inwardly from the marginal edge of blank 60. The spraying of marginal edge 87 with protective coat material 8 may be done either manually, or with other conventional automated devices.

After protective coat material 8 is applied to the marginal edge 87 of blank assembly 85, and before curing the same, a layer of protective coat material 8 is applied to the top surface 61 of blank assembly 85, so as to completely cover those surfaces of blank assembly 85 which are normally exposed to use. Protective coat material 8 is preferably applied in an extremely uniform layer on the top surface 61 and marginal edge 87 of blank assembly 85, so as to maximize durability, and facilitate a uniform appearance when the protective coat material 8 is cured. A conventional curtain coater, a roll coater or other similar devices, such as a sprayer, may be used to apply protective coat material 8 to the top surface 61 of blank assembly 85. The top coat of protective material 8 will blend in with the oversprayed protective material 8 from marginal edge 87. Preferably, the protective coat layer 8 has a total thickness in the range of two to three mil.

The blank assembly 85 with uncured protective coat material 8 thereon is then translated through a dust free environment into UV processor 9.

With reference to FIGS. 30 and 31, UV processor 9 comprises an elongated, tunnel shaped irradiation chamber 95. A conveyor is provided to translate the coated workblank assemblies 85 through irradiation chamber 95, and in the illustrated example, comprises a plurality of powered rollers 10, which are arranged in groups along the length of chamber 95 to define spaces 13 between power rollers 10. The UV lamps 11 are generally located in the spaces 13 between adjacent groups of rollers 10, so that rollers 10 do not interfere with the uniform irradiation of protective coat material 8, and are not overheated by UV lamps 11.

In the illustrated example, irradiation chamber 95 includes three separate sections 96–98, which correspond to three different UV curing stages or phases. It is to be understood that the present process can be also used with a single stage processor, and/or other one phase curing processes, although different types of surface finishes may result In the present UV processor 9, the first chamber 96 has an air or oxygen atmosphere, and includes four, medium pressure mercury, high energy lamps or light sources 99–102. UV lamp 99 is positioned generally vertically in line with an upstream roller space 13a, above power rollers 10. UV lamp 99 includes a reflector 103 which is oriented to direct ultraviolet flux emitted from lamp 99 in a downwardly and downstream direction, at an acute angle with the longitudinal axis of irradiation chamber 95. UV lamp 100 is disposed generally vertically below roller space 13a, in line with UV lamp 99, below power rollers 10. UV lamp 100 includes a reflector 104 which is oriented to direct ultraviolet flux emitted from lamp 100 in a generally upwardly and downstream direction, at an acute angle with respect to longitudinal axis of irradiation chamber 95. UV lamp 101 is positioned vertically in line with a downstream roller space 13b, above power rollers 10. UV lamp 101 includes a reflector 105 which is oriented to direct ultraviolet flux emitted from UV lamp 101 in a generally downwardly and upstream direction, at an acute angle with respect to the longitudinal axis of irradiation chamber 95. UV lamp 102 is positioned vertically in line with roller space 13b, below UV lamp 101 and power rollers 10. UV lamp 102 includes a reflector 106, which is oriented to direct ultraviolet flux emitted from UV lamp 102 in a generally upwardly and upstream direction, at an acute angle with respect to the longitudinal axis of irradiation chamber 95. Irradiation of coated blank assembly 85 in chamber 1 initiates curing of protective coat material 8 from the interiormost surfaces thereof outwardly, since the air atmosphere in chamber 1 tends to impede the curing process. An apparatus and method for ultraviolet light treatment in a controlled atmosphere such as oxygen are disclosed in Coleman U.S. Pat. No. 3,790,801 and Hahn U.S. Pat. No. 3,918,393, which are assigned to PPG Industries, Inc.

The second portion 97 of irradiation chamber 95 has an inert gas atmosphere, such as nitrogen, and includes eight, low power germicidal UV lamps 110-117, with associated reflectors 118-125. UV lamps 110 and 111 are vertically in line with roller space 13c, and disposed above and below power rollers 10. The reflectors 118 and 119 associated with UV lamps 110 and 111 are oriented to direct UV energy in a direction generally perpendicular to the longitudinal axis of irradiation chamber 95. UV lamps 112 and 113 are vertically in line with roller space 13d, and disposed above and below power rollers 10. The reflector 120 associated with UV lamp 112 is positioned to direct UV flux in a generally downwardly and downstream direction at an acute angle with respect to the longitudinal axis of irradiation chamber 95. The reflector 121 associated with UV lamp 113 is positioned to direct UV flux in a generally upwardly and downstream direction, at an acute angle with respect to the longitudinal axis of irradiation chamber 95. UV lamps 114 and 115 are vertically in line with roller space 13e, and are disposed above and below power rollers 10. The reflector 122 associated with UV lamp 114 is oriented to direct ultraviolet flux in a generally downwardly and upstream direction, at an acute angle with respect to the longitudinal axis of irradiation chamber 95. The reflector 123 associated with UV lamp 115 is positioned to direct ultraviolet flux in a generally upwardly and upstream direction, at an acute angle with respect to the longitudinal axis of irradiation chamber 95. UV lamps 116 and 117 are vertically aligned with roller space 13f, and have their associated reflectors 124 and 125 positioned to direct UV flux in a direction generally perpendicular with the longitudinal axis of irradiation chamber 95. The UV lamps 110-117 in irradiation chamber 97 cause texturing to take place in the exterior surfaces of protective coat material 8.

The third portion 98 of irradiation chamber 95 also has an inert gas atmosphere, such as nitrogen, and includes four, medium pressure mercury, high power UV lamps 130-133, with associated reflectors 134-137. UV lamps 130 and 131 are positioned vertically in line with roller gap 13g, and disposed above and below power rollers 10. UV lamps 132 and 133 are positioned vertically in line with roller gap 13h and disposed above and below power rollers 10. UV lamp reflectors 134-137 are oriented in a pattern substantially identical to the reflectors 103-106 of UV lamps 99-102. The third irradiation chamber 98 serves to finish curing all of the protective coat material 8. Methods for producing textured coatings are disclosed in Osborn et al. U.S. Pat. No. 3,840,446 and Troue U.S. Pat. No. 4,421,784, which are assigned to Union Carbide Corporation.

The angled orientation of reflectors 103, 106, 112-115 and 134-138 associated with UV lamps 99-102, 112-115 and 130-133 causes ultraviolet flux to be directed onto the leading and trailing marginal edge surfaces of blank 185. In the illustrated example, the outer planes of angled reflectors 103-106, 112-115 and 134-138 are oriented at an angle in the range of 50°-70 with respect to the longitudinal centerline of irradiation chamber 98. Furthermore, each of the reflectors 103-106, 118-125 and 134-137 has a generally parabolic vertical cross-sectional shape which directs the UV energy in a non-focused, dispersed manner across the UV coated surfaces of blank assembly 85.

As best illustrated in FIGS. 32 and 33, each of the reflectors 103-106, 118-125 and 134-137 extend beyond the length of the associated UV lamps 99-102, 110-117 and 130-133 respectively, and include downwardly oriented, arcuately shaped ends 140, which serve to direct ultraviolet flux onto the side surfaces of blank assembly 85.

In this manner, all of the UV coated surfaces of blank assembly 85 are irradiated substantially contemporaneously and generally uniformly as blank assembly 85 translates through the irradiation chamber 95, so as to quickly and evenly cure protective coat material 8 in a single pass, continuous feed operation.

With reference to FIG. 35, high energy lamps 99-106 and 130-133 may be mounted on an adjustable base 140, which permits angular adjustment of the associated UV lamp 11 and reflector assembly 14 about a pivot pin 141, and longitudinal adjustment of the same along a slide track 142. With reference to FIG. 36, low power lamps 110-117 may also be mounted on an adjustable base 143, which permits angular adjustment of the associated UV lamp 11, reflector assembly 14 about a pivot pin 144, and longitudinal adjustment of the same along a slide track 145. The adjustability of bases 140 and 143 permits varying the distance UV lamps 11 are disposed from the blank assembly 85 translating therebelow on powered rollers 10, and the angular orientation of the associated reflector 1 to insure uniform irradiation of the protective coat material 8.

Blowers 147 and 148 (FIG. 31) serve to maintain the proper inert gas atmosphere in chamber sections 97 and 98, and to isolate them from the air or oxygen atmosphere in chamber section 96.

The finish worksurface 1 resultant from the present invention has a unique monolithic appearance, as if the part were chiseled from a solid block of material. The finished worksurface has an extremely durable, low gloss finish which has a soft feel, and is substantially maintenance free and mar-resistant.

In the foregoing description, it will be readily appreciated by those skilled in the ar that modifications may be made to the invention without departing from the concepts disclosed herein. Such modifications are to be considered as included in the following claims, unless these claims by their language expressly state otherwise.

The embodiments of the invention in which an exclusive property of privilege is claimed are defined as follows.

1. A process for making furniture worksurfaces and the like, comprising:
   providing a sheet of substantially rigid substrate material;
   forming a blank from the sheet of substrate material, wherein the blank has a preselected shape according to a selected worksurface article, and is defined by first and second oppositely oriented face surfaces, and a marginal edge surface disposed contiguously therebetween;

forming a groove through the first surface of the blank located a preselected distance laterally inwardly from the blank marginal edge surface to a depth adjacent to but not through the second surface of the blank;

providing a curable, liquid edge protection material formulated to adhere to the substrate material, and adapted to provide a durable edge guard for a marginal edge portion of the selected worksurface article;

pouring the edge protection material into the groove to a preselected level;

curing the edge protection material in plac in the groove to a solid condition;

cutting through the cured edge protection material in the groove, as well as the adjacent second surface of the blank, to create a decoratively shaped, integrally formed, protective strip about the marginal edge of the selected worksurface article.

2. A process as set forth in claim 1, including:
drying the blank after said groove forming step to remove moisture from the groove.

3. A process as set forth in claim 2, wherein:
said groove forming step comprises routing the groove in the blank.

4. A process as set forth in claim 3, wherein:
said edge protection cutting step comprises routing through the cured edge protection material in the groove, as well as the adjacent second surface of the blank.

5. A process as set forth in claim 4, wherein:
said edge protection routing step comprises a two process, wherein a first pass removes corners of the blank, and a second pass forms the marginal edge.

6. A process as set forth in claim 5, wherein:
said groove forming step comprises forming the groove with a width of greater than ⅜ inch to facilitate completely filling the same with the edge protection material.

7. A process as set forth claim 6, wherein:
said sheet providing step comprises providing a sheet of medium density fiberboard from which the blank is formed.

8. A process as set forth in claim 7, wherein:
said edge protection material providing step comprises providing a liquid, air curable polyurethane.

9. A process as set forth in claim 8, including:
providing a curable, liquid base coat material formulated to adhere to the substrate material and the edge protection material, and adapted to provide a preselected finish for the blank;

applying the base coat material to the first surface, second surface and protective strip of the blank, so as to substantially completely cover the same;

curing the base coat material to a substantially dry condition to form a base coat which envelopes the blank;

providing a liquid, protective coat material which cures when exposed to selected ultraviolet radiation, and is formulated to adhere to the base coat material, and provide a substantially clear, mar-resistant coat over at least selected portions of the base coat;

applying the protective coat material to the first surface and protective strip of the blank, as well as at least a portion of the second surface of the blank disposed contiguous with the protective strip to define a protected exterior surface area of the blank which is substantially completely covered with the protective coat material;

providing a multi-stage, continuous feed, ultraviolet processor having at least first and second curing stations adapted to selectively and sequentially cure the protective coat material;

translating the blank with uncured protective coat material thereon through the ultraviolet processor at a substantially constant rate, including:

radiating the protected exterior surface area of the blank substantially contemporaneously with ultraviolet energy as the blank passes through the first station of the ultraviolet processor to partially cure the protective coat material to facilitate forming a selected exterior appearance and subsequently radiating the protected exterior surface area of the blank substantially contemporaneously with ultraviolet energy as the blank passes through the second station of the ultraviolet processor to complete curing of the protective coat material to form a mar-resistant, low gloss protective coat over the base coat, which base coat and protective coat collectively impart a monolithic appearance to the finished worksurface article.

10. A process as set forth in claim 1, wherein:
said groove forming step comprises routing the groove in the blank.

11. A process as set forth in claim 1, wherein:
said edge protection cutting step comprises routing thor ugh the cured edge protection material in the groove, as well as the adjacent second surface of the blank.

12. A process as set forth in claim 11, wherein:
said edge protection routing step comprises a two pass process, wherein a first pass removes the corners of the blank, and a second pass forms the final marginal edge surface.

13. A process as set forth in claim 1, wherein:
said groove forming step comprises forming the groove with a width of greater than ⅜ inch to facilitate completely filling the same with the edge protection material.

14. A process as set forth in claim 1, wherein:
said sheet providing step comprises providing a sheet of medium density fiberboard from which the blank is formed.

15. A process as set forth in claim 1, wherein:
said edge protection material providing step comprises providing a liquid, air curable polyurethane.

16. A process as set forth in claim 1, including:
providing a curable, liquid base coat material formulated to adhere to the substrate material and the edge protection material, and adapted to provide a preselected finish for the blank;

applying the base coat material to the first surface, second surface and protective strip of the blank, so as to substantially completely cover the same;

curing the base coat material to a substantially dry condition to form a base coat which envelopes the blank;

providing a liquid, protective coat material which cures when exposed to selected ultraviolet radiation, and is formulated to adhere to the base coat material, and provide a substantially clear, mar-resistant coat over at least selected portions of the base coat;

applying the protective coat material to the first surface and protective strip of the blank, as well as at least a portion of the second surface of the blank disposed continuous with the protective strip to define a protected exterior surface area of the blank which is substantially completely covered with the protective coat material;

substantially completely covered with the protective coat material;

providing a continuous feed, ultraviolet processor having at one curing station adapted to selectively and sequentially cure the protective coat material;

translating the blank with uncured protective coat material thereon through the ultraviolet processor at a substantially constant rate, including radiating the protected exterior surface area of the blank substantially contemporaneously with ultraviolet energy as the blank passes through the one station of the ultraviolet processor to selectively cure the protective coat material to form a mar-resistant, low gloss protective coat over the base coat, which base coat and protective coat collectively impart a monolithic appearance to the finished worksurface article.

17. A process as set forth in claim 16, wherein: said blank translating and radiating step includes:

providing a plurality of powered conveyor rollers arranged side-by-side in a mutually parallel relationship that form a row which extends longitudinally through the ultraviolet processor;

arranging the powered conveyor rollers in at least two distinct groups with a space therebetween;

providing a first UV energy source capable of performing at least a portion of said radiating step;

positioning the first UV energy source above or below said space;

placing the blank with uncured protective coat material thereon on an upstream end of the row of powered conveyor rollers to translate the blank through the ultraviolet processor.

18. A process as set forth in claim 17, wherein: said blank translating and radiating step further includes:

positioning said first UV energy source a predetermined distance below the row of powered conveyor rollers.

19. A process as set forth in claim 18, wherein: said blank translating and radiating step further includes:

providing a first reflector around the first UV energy source to direct UV energy emitted therefrom;

orienting the first reflector so that the first UV energy is directed at a predetermined acute angel to the row of powered conveyor rollers, toward the upstream end thereof, so as to uniformly radiate leading portions of the marginal edge surface of the blank as the same passes through the ultraviolet processor.

20. A process for making furniture panels and the like, comprising:

providing a sheet of substrate material;

forming a blank from the sheet of substrate material, wherein the blank has a preselected shape according to a selected panel article, and is defined by first and second oppositely oriented face surfaces, and a marginal edge surface disposed contiguously therebetween;

forming a groove through the first surface of the blank located laterally inwardly from the blank marginal edge surface to a depth adjacent to but not through the second surface of the blank;

providing an edge protection material formulated to adhere to the substrate material, and adapted to provide a durable edge guard for a marginal edge portion of the selected panel article;

placing the edge protection material into the groove;

cutting through the cured edge protection material in the groove, as well as the adjacent second surface of the blank to create a decoratively shaped, protective strip about the marginal edge of the selected panel article.

21. A process as set forth in claim 20, including:

drying the blank after said groove forming step to remove moisture from the groove.

22. A process as set forth in claim 21, wherein:

said groove forming step comprises routing the groove in the blank.

23. A process as set forth in claim 22, wherein:

said edge protection cutting step comprises routing through the cured edge protection material in the groove, as well as the adjacent second surface of the blank.

24. A process as set forth in claim 23, wherein:

said edge protection routing step comprises a two pass process, wherein a first pass remove corners of the blank, and a second pass forms the marginal edge.

25. A process as set forth in claim 24, wherein:

said groove forming step comprises forming the groove with a width of greater than ⅜ inch to facilitate completely filling the same with the edge protection material.

26. A process as set forth in claim 25, wherein:

said sheet providing step comprises providing a sheet of medium density fiberboard from which the blank is formed.

27. A process as set forth in claim 26, wherein:

said edge protection material providing step comprises providing a liquid, air curable polyurethane.

28. A process as set forth in claim 27, including:

providing a curable, liquid base coat material formulated to adhere to the substrate material and the edge protection material, and adapted to provide a preselected finish for the blank;

applying the base coat material to the first surface, second surface and protective strip of the blank, so as to substantially completely cover the same;

curing the base coat material to a substantially dry condition to form a base coat which envelopes the blank;

providing a liquid, protective coat material which cures when exposed to selected ultraviolet radiation, and is formulated to adhere to the base coat material, and provide a substantially clear, mar-resistant coat over at least selected portions of the base coat;

applying the protective coat material to the first surface and protective strip of the blank, as well as at least a portion of the second surface of the blank disposed continguous with the protective strip to define a protected exterior surface area of the blank which is substantially completely covered with the protective coat material;

providing a multi-stage, continuous feed, ultraviolet processor having at last first and second curing stations adapted to selectively and sequentially cure the protective coat material;

translating the blank with uncured protective coat material thereon through the ultraviolet processor at a substantially constant rate, including:

radiating the protected exterior surface area of the blank substantially contemporaneously with ultraviolet energy as the blank passes through the first station of the ultraviolet processor to partially cure the protective coat material to facilitate forming a selected exterior appearance and subsequently radiating the protected exterior surface area of the blank substantially contemporaneously with ultraviolet energy as the blank passes through the second station of the ultraviolet processor to complete curing of the protective coat material to form a mar-resistant, low gloss protective coat over the base coat, which base coat and protective coat collectively impart a monolithic appearance to the finished panel article.

29. A process as set forth in claim 20, wherein:
said groove forming step comprises routing the groove in the blank.

30. A process as set forth in claim 20, wherein:
said edge protection cutting step comprises routing through the cured edge protection material in the groove, as well as the adjacent second surface of the blank.

31. A process as set forth in claim 30, wherein:
said edge protection routing step comprises a two pass process, wherein a first pass removes corners of the blank, and a second pass forms the marginal edge.

32. A process as set forth in claim 20, wherein:
said groove forming step comprises forming the groove with a width of greater than ⅜ inch to facilitate completely filling the same with the edge protection material.

33. A process as set forth in claim 20, wherein:
said sheet providing step comprises providing a sheet of medium density fiberboard from which the blank is formed.

34. A process as set forth in claim 20, wherein:
said edge protection material providing step comprises providing a liquid, air curable polyurethane.

35. A process as set forth in claim 20, including:
providing a curable, liquid base coat material formulated to adhere to the substrate material and the edge protection material, and adapted to provide a preselected finish for the blank;

applying the base coat material to the first surface, second surface and protective strip of the blank, so as to substantially completely cover the same;

curing the base coat material to a substantially dry condition to form a base coat which envelopes the blank;

providing a liquid, protective coat material which cures when exposed to selected ultraviolet radiation, and is formulated to adhere to the base coat material, and provide a substantially clear, mar-resistant coat over at least selected portions of the base coat;

applying the protective coat material to the first surface and protective strip of the blank, as well as at least a portion of the second surface of the blank disposed contiguous with the protective strip to define a protected exterior surface area of the blank which is substantially completely covered with the protective coat material;

providing a multi-stage, continuous feed, ultraviolet processor having at least first and second curing stations adapted to selectively and sequentially cure the protective coat material;

translating the blank with uncured protective coat material thereon through the ultraviolet processor at a substantially constant rate, including:

radiating the protected exterior surface area of the blank substantially contemporaneously with ultraviolet energy as the blank passes through the first station of the ultraviolet processor to partially cure the protective coat material to facilitate forming a selected exterior appearance and subsequently radiating the protected exterior surface area of the blank substantially contemporaneously with ultraviolet energy as the blank passes through the second station of the ultraviolet processor to complete curing of the protective coat material to form a mar-resistant, low gloss protective coat over the base coat, which base coat and protective coat collectively impart a monolithic appearance to the finished panel article.

* * * * *

UNITED STATES PATENT AND TRADEMARK OFFICE
CERTIFICATE OF CORRECTION

PATENT NO. : 5,116,639

DATED : May 26, 1992

INVENTOR(S) : Stephen B. Kolk et al

It is certified that error appears in the above-identified patent and that said Letters Patent is hereby corrected as shown below:

```
Column 1, line 46;
    After "plans" insert --,--.
Column 1, lines 47 & 48;
    After "desirable" insert --,--.
Column 1, line 60;
    After "article" insert --,--.
Column 2, line 54;
    After "rate" insert --,--.
Column 3, line 65;
    After "in" insert --phantom--.
Column 6, line 19;
    After "unit" insert --,--.
Column 6, line 21;
    After "unit" (first occurrence) insert --,--.
Column 6, line 62;
    After "material" insert --,--.
Column 7, line 17;
    After "blank 60" insert --,--.
Column 10, line 45;
    After "result" insert --,--.
Column 12, line 5;
    "50%-70" should be --50-70°--.
Column 12, line 39;
    "reflector 1" should be --reflector 14--.
Column 12, line 52;
    "in the ar" should be --in the art--.
*Column 12, line 58;
    "property of" should be --property or--.
```

UNITED STATES PATENT AND TRADEMARK OFFICE
CERTIFICATE OF CORRECTION

PATENT NO.  : 5,116,639

DATED       : May 26, 1992

INVENTOR(S) : Stephen B. Kolk et al

It is certified that error appears in the above-identified patent and that said Letters Patent is hereby corrected as shown below:

```
Column 13, line 15, claim 1;
    "plac" should be --place--.
Column 13, line 34, claim 5;
    After "two" insert --pass--.
Column 14, line 33, claim 11;
    "thor ugh" should be --through--.
Column 16, line 30, claim 24;
    "remove" should be --removes--.
```

Signed and Sealed this

Nineteenth Day of January, 1993

Attest:

DOUGLAS B. COMER

Attesting Officer

Acting Commissioner of Patents and Trademarks